(12) United States Patent
Subrahmanyam et al.

(10) Patent No.: US 7,243,339 B2
(45) Date of Patent: Jul. 10, 2007

(54) SYSTEM AND METHOD TO DECREASE PROGRAM ANALYSIS OVERHEAD

(75) Inventors: Pratap Subrahmanyam, Sunnyvale, CA (US); Nathaniel McIntosh, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1041 days.

(21) Appl. No.: 09/898,351

(22) Filed: Jul. 3, 2001

(65) Prior Publication Data

US 2003/0009749 A1    Jan. 9, 2003

(51) Int. Cl.
  *G06F 9/44*    (2006.01)
(52) U.S. Cl. ...................................... 717/130
(58) Field of Classification Search ................ 717/130, 717/140, 158, 160; 711/104, 133, 213; 712/239; 714/47; 718/100
See application file for complete search history.

(56) References Cited

U.S. PATENT DOCUMENTS

| 5,566,324 | A | * | 10/1996 | Kass | 711/160 |
| 5,950,009 | A | * | 9/1999 | Bortnikov et al. | 717/158 |
| 6,065,108 | A | * | 5/2000 | Tremblay et al. | 712/201 |
| 6,374,349 | B1 | * | 4/2002 | McFarling | 712/239 |
| 6,668,372 | B1 | * | 12/2003 | Wu | 717/130 |
| 6,681,387 | B1 | * | 1/2004 | Hwu et al. | 717/158 |
| 6,738,865 | B1 | * | 5/2004 | Burton et al. | 711/133 |
| 2001/0021959 | A1 | * | 9/2001 | Holmberg et al. | 711/104 |

* cited by examiner

*Primary Examiner*—Tuan A Vu

(57) ABSTRACT

System and method are described for program analysis with data caching. Briefly described, in architecture, the system can be implemented as follows. The present invention for program analysis with data caching includes a counter for tracking each time on of a plurality of blocks of code in the computer program is executed. A counter cache stores the plurality of counters of the plurality of blocks of code that are most recently executed. A storage area stores a plurality of counters of the plurality of blocks of code that are not most recently executed code.

17 Claims, 9 Drawing Sheets

SYSTEM AND METHOD TO DECREASE PROGRAM ANALYSIS OVERHEAD

BACKGROUND OF THE INVENTION

1. Field of the Invention

The present invention generally relates to a system and method for analyzing a program and, more particularly, for decreasing the program analysis operation overhead.

2. Description of Related Art

As is known in the computer and software arts, when a software program is developed, there is generally a need to speed up the execution of the software program. One tool to assist a programmer in speeding up a software program are program analysis tools. Program analysis tools are used for the purpose of analyzing software programs in search of specific information, such as, for instance, analysis tools can be used to compute the number of times a branch is taken, versus executed, during the lifetime of the software program.

Programming analysis tools can also insert probes into a software program before a particular instruction that needs to be probed. This probe code will increment decrement a counter that is located in memory, i.e., such is a global data structure. Finally, when a software program is ready to end, the entire global data structure for the counters can be written to an output file in a human readable form. This allows the programmers to analyze the application program to determine instances and scenarios in which the application program may be modified to increase its efficiency.

However, there is a problem associated with these counters. Because the counters may be updated at anytime, the counters are loaded into memory as global data structures. These global data structures cause the memory footprint of the program analysis system to be dramatically increased, even if many of these counters are never accessed because the instructions being probed are never executed.

Thus, a heretofore unaddressed need exists in the industry to address the aforementioned deficiencies and inadequacies.

SUMMARY OF THE INVENTION

The present invention provides a system and method for providing program analysis with data caching. Briefly described, in architecture, the system can be implemented as follows. The present invention for program analysis with data caching includes a counter for tracking each time one of a plurality of blocks of code in the computer program is executed. A counter cache stores the plurality of counters of the plurality of blocks of code that are most recently executed. A storage area stores a plurality of counters of the plurality of blocks of code that are not most recently executed code.

The present invention can also be viewed as providing a method for providing program analysis with data caching. In this regard, the method can be broadly summarized by the following steps executing said computer program; (1) using a counter for tracking each time one of said plurality of blocks of code is executed; (2) maintaining a counter cache for storing said plurality of counters of said plurality of blocks of code that are most recently executed; and (3) maintaining a storage area for storing a plurality of counters of said plurality of blocks of code that are not most recently executed.

BRIEF DESCRIPTION OF THE DRAWINGS

The accompanying drawings incorporated in and forming a part of the specification illustrate several aspects of the present invention, and together with the description, serve to explain the principles of the invention. In the drawings.

DETAILED DESCRIPTION OF THE PREFERRED EMBODIMENT

Figure 1:
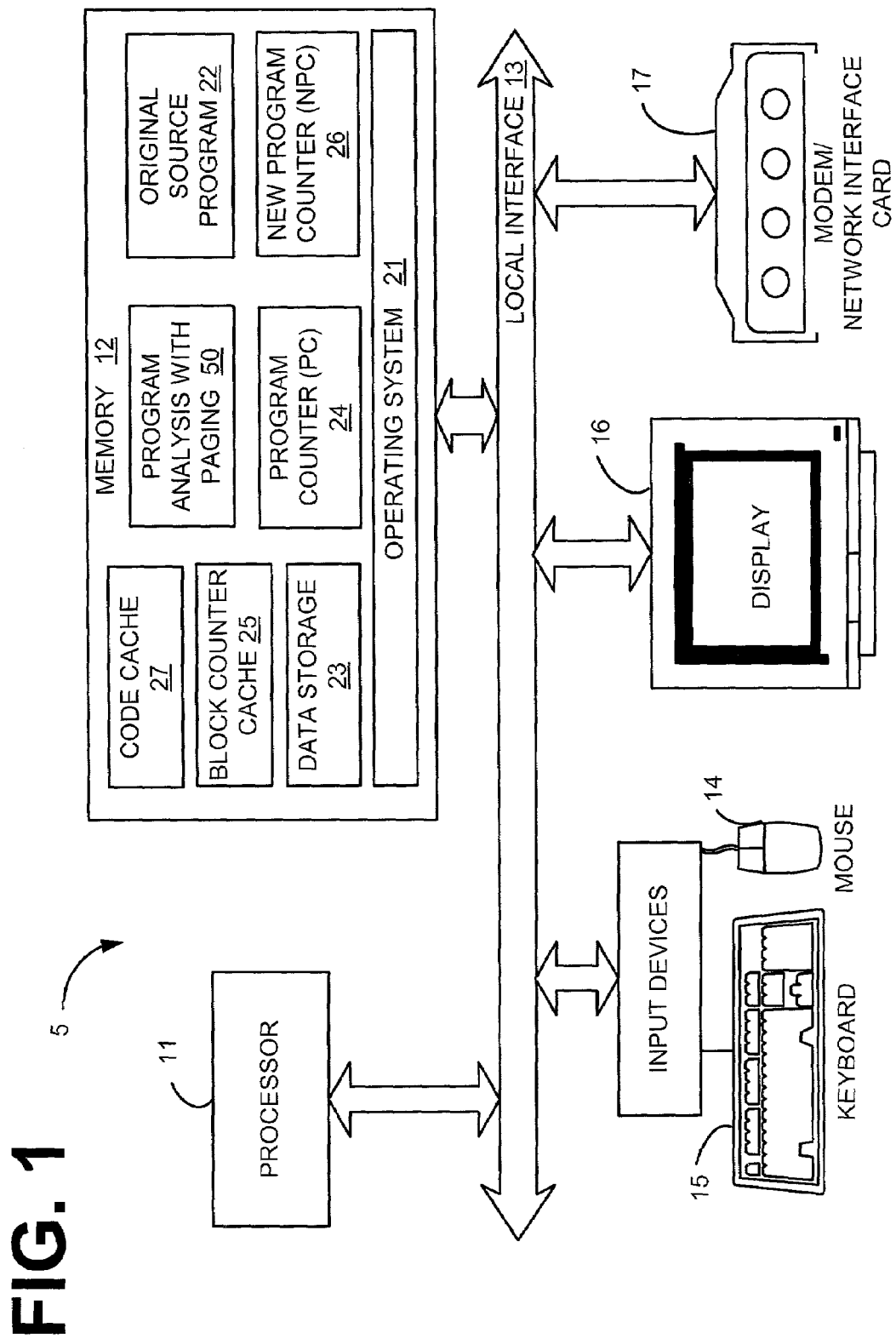
FIG. 1 is a block diagram of a user system showing the program analysis with data caching system of the present invention and original source program within the memory area.

Reference will now be made in detail to the description of the invention as illustrated in the drawings. Although the invention will be described in connection with these drawings, there is no intent to limit it to the embodiment or embodiments disclosed therein. On the contrary, the intent is to include all alternatives, modifications, and equivalents included within the spirit and scope of the invention as defined by the appended claims.

The program analysis with paging system of the invention can be implemented in software (e.g., firmware), hardware, or a combination thereof. In the currently contemplated best mode, the program analysis with paging system is implemented in software, as an executable program, and is executed by a special or general purpose digital computer, such as a personal computer (PC; IBM-compatible, Apple-compatible, or otherwise), workstation, minicomputer, or mainframe computer. An example of a general-purpose computer that can implement the program analysis with paging system of the present invention is shown in FIG. 1. In FIG. 1, the program analysis with paging system is denoted by reference numeral 50.

Generally, in terms of hardware architecture, as shown in FIG. 1, the computer 5 includes a processor 11, memory 12, and one or more input and/or output (I/O) devices (or peripherals) that are communicatively coupled via a local interface 13. The local interface 13 can be, for example but not limited to, one or more buses or other wired or wireless connections, as is known in the art. The local interface 13 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 11 is a hardware device for executing software that can be stored in memory 12. The processor 11 can be any custom made or commercially available processor, a central processing unit (CPU), an auxiliary processor among several processors associated with the computer 5, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 12 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 12 may incorporate electronic, magnetic, optical, and/or other types of storage media. Note that the memory 12 can have a distributed architecture, where various components are situated remote from one another, but can be accessed by the processor 11.

The software in memory 12 may include one or more separate programs, each of which comprises an ordered listing of executable instructions for implementing logical functions. In the example of FIG. 1, the software in the memory 12 includes the program analysis with paging system 50 and a suitable operating system (O/S) 21. A non-exhaustive list of examples of suitable commercially available operating systems 21 is as follows: a Windows operating system from Microsoft Corporation, U.S.A., a Netware operating system available from Novell, Inc., U.S.A., an operating system available from IBM, Inc., U.S.A., any LINUX operating system available from many vendors or a UNIX operating system, which is available for purchase from many vendors, such as Hewlett-Packard Company, U.S.A., Sun Microsystems, Inc. and AT&T Corporation, U.S.A. The operating system 21 essentially controls the execution of other computer programs, such as the program analysis with paging system 50, and provides scheduling, input-output control, file and data management, memory management, and communication control and related services.

The program analysis with paging system 50 is a source program, executable program (object code), script, or any other entity comprising a set of instructions to be performed. When a source program, then the program needs to be translated via a compiler, assembler, interpreter, or the like, which may or may not be included within the memory 12, so as to operate properly in connection with the O/S 21. Furthermore, the program analysis with paging system 50 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices may include input devices, for example but not limited to, a keyboard 15, mouse 14, scanner, microphone, etc. Furthermore, the I/O devices may also include output devices, for example but not limited to, a printer, display 16, etc. Finally, the I/O devices may further include devices that communicate both inputs and outputs, for instance but not limited to, a modulator/demodulator 17(modem; for accessing another device, system, or network), a radio frequency (RF) or other transceiver, a telephonic interface, a bridge, a router, etc.

If the computer 5 is a PC, workstation, or the like, the software in the memory 12 may further include a basic input output system (BIOS) (omitted for simplicity). The BIOS is a set of essential software routines that initialize and test hardware at startup, start the O/S 21, and support the transfer of data among the hardware devices. The BIOS is stored in ROM so that the BIOS can be executed when the computer 5 is activated.

When the computer 5 is in operation, the processor 11 is configured to execute software stored within the memory 12, to communicate data to and from the memory 2, and to generally control operations of the computer 5 pursuant to the software. The program analysis with paging system 50 and the O/S 21, in whole or in part, but typically the latter, are read by the processor 11, perhaps buffered within the processor 11, and then executed.

When the program analysis with paging system 50 is implemented in software, as is shown in FIG. 1, it should be noted that the program analysis with paging system 50 can be stored on any computer readable medium for use by or in connection with any computer related system or method. In the context of this document, a computer readable medium is an electronic, magnetic, optical, or other physical device or means that can contain or store a computer program for use by or in connection with a computer related system or method.

The program analysis with paging system 50 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the program analysis with paging system 50 is implemented in hardware, the program analysis with paging system 50 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
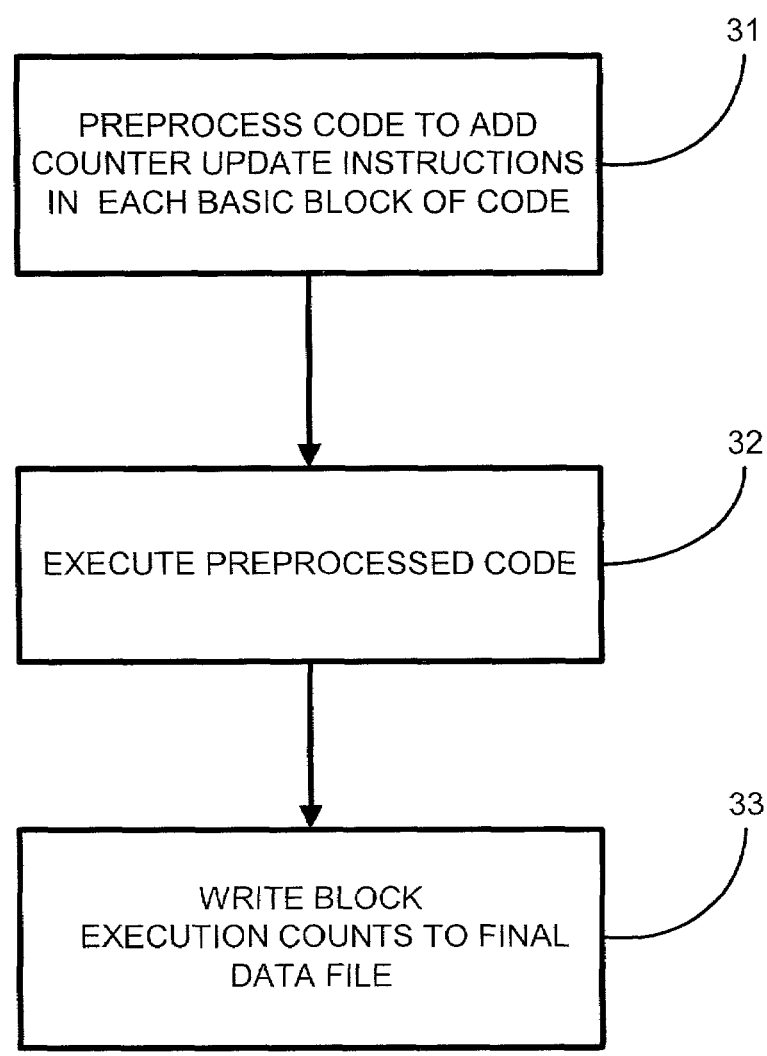
FIG. 2 is a flow chart of a well known prior art method to perform program analysis.

Illustrated in FIG. 2 is the prior art methodology for performing program analysis of an executing program, in particular, counting the number of times each block of code is executed. First, the original source code is preprocessed to add a counter update instruction in each basic block code at step 31. The preprocesssing step is static or "off-line", in that it takes place prior to the execution of the program. As a result, the programmer or tool must add counter code for every block that could ever execute. In practice, this means instrumenting every block in the program. This can be very time consuming if performed by hand of the program developer or by the process of utilizing a special routine such as, but not limited to, a debug tool, to insert the counter instruction within each basic block of code.

Next, the modified source code is executed at step 32. In the prior art methodology, memory for holding block execution counts is allocated monolithically at runtime. Thus at the start of program execution, the modified program allocates memory to store counter values for all the blocks in the program, even those blocks that are never subsequently executed. This allocation scheme is wasteful, and results in poor data locality when counter values are accessed at runtime. Lastly, the program analysis writes the block execution counts to a final data file at step 33. This allows the programmer to analyze which blocks of code were the most executed and if some blocks of code were not even executed during the running of program being analyzed.

As noted above, the adding block counter method causes increased developer time to insert the counter instructions into the program as well as time required to recompile or reassemble and link the program. The modified program will almost always runs much slower than the original program as a result of the additional instructions and input/output processing required for each block. There is also a resource requirement of a large amount of disk storage to hold the code block execution documentation.

Figure 3:
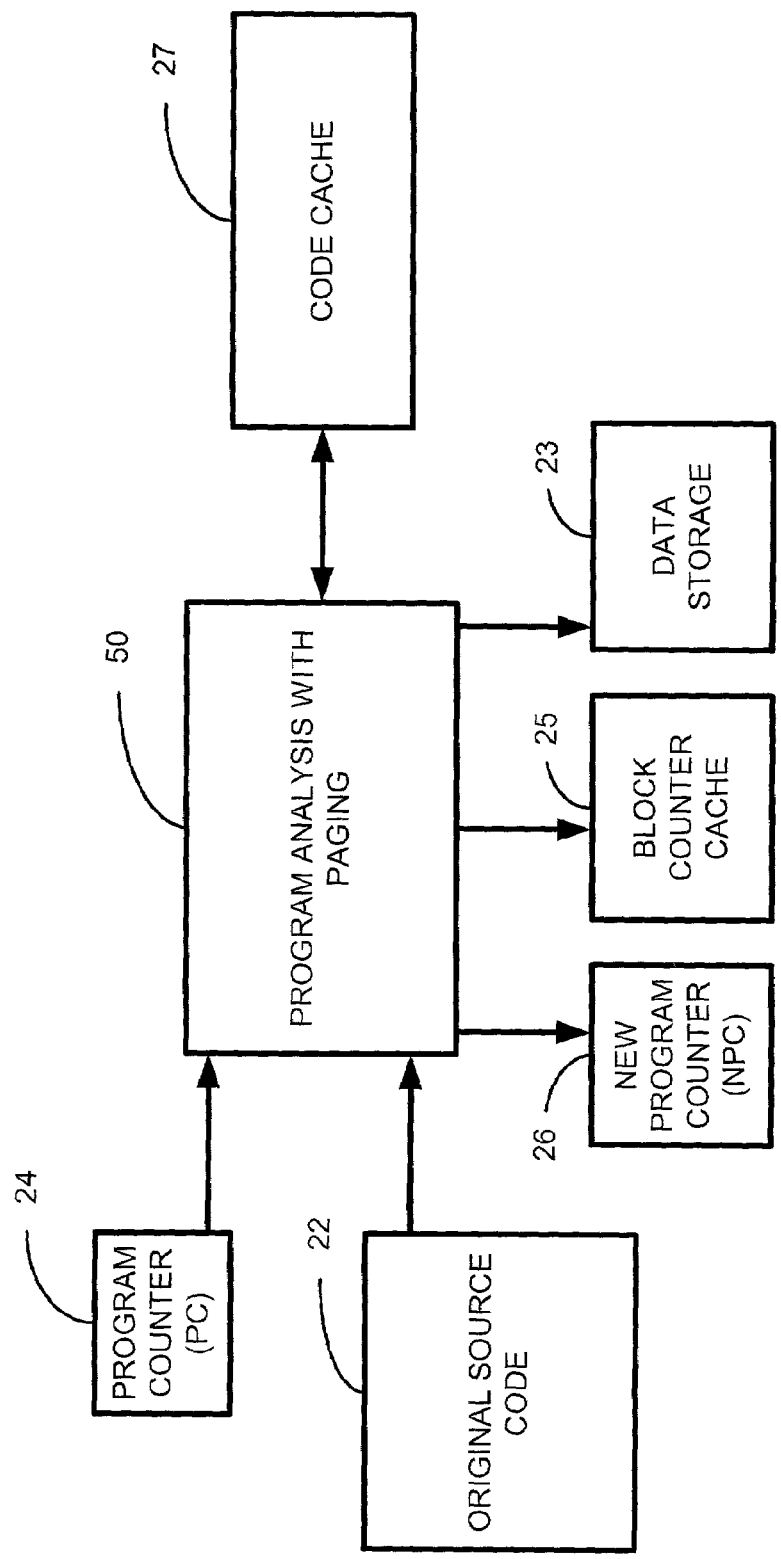
FIG. 3 is a block diagram of the program analysis with data caching system interaction with the program counter, original source code, new program counter, code cache and block counter cache, as shown in FIG. 1.

Illustrated in FIG. 3 is a block diagram of the program analysis with data caching system 50 components of the present invention as shown in FIG. 1. To illustrate the invention, an on-line (i.e. dynamic) program analysis system is described, in which counter code is added dynamically as the program executes. The present invention is also applicable to static or off-line program analysis tools, as described later in this disclosure.

The program analysis with data caching system 50 acquires the address of the next instruction in the original source code 22 to be executed from the program counter 24. The program analysis with data caching system 50 then performs the translation of the original source 22 and inserts this translated program code into the code cache 27. A new program counter (NPC) 26, which points to the beginning of the translated code, is returned for later execution during program analysis. The block counter cache 25 is utilized to store the block execution counter for each block of the translated code. The data storage 23 is utilized to store the stale code block frequency counter data that is not kept in the block counter cache 25. The method of the present invention performed by the program analysis with data caching system 50 is herein defined in further detail with regard to FIGS. 4-8.

Figure 4:
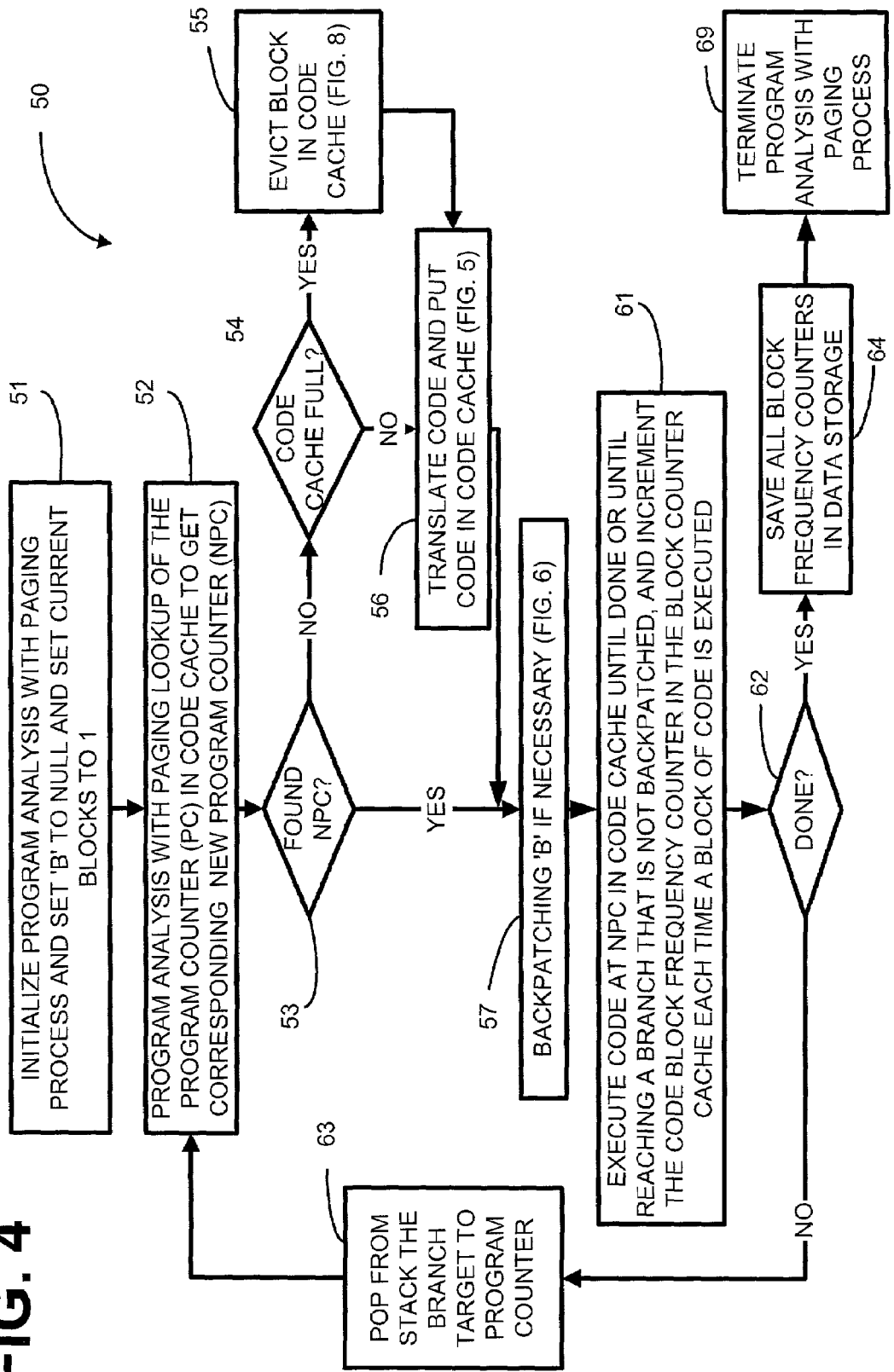
FIG. 4 is a flow chart of an example of the preferred embodiment to perform the program analysis with data caching, as shown in FIGS. 1 and 3.

FIG. 4 is a flow chart of an example of the program analysis with data caching system 50 of the present invention, as shown in FIGS. 1 and 3. First, the program analysis with data caching process initializes the backpatch pointer "B" to null and sets the current number of blocks to one (1) at step 51. Backpatching is further explained hereinafter in further detail with regard to FIG. 6. The program analysis with data caching system 50 then performs a lookup using the program counter 24 in the code cache 27 to get the corresponding new program counter 26 at step 52.

At step 53, the program analysis with data caching system 50 checks to see if the new program counter is found. If it is determined at step 53 that the new program counter was found, the program analysis with data caching system 50 proceeds to step 57.

If it is determined at step 53, that the new program counter is not found, the program analysis with data caching system 50 then determines whether the code cache is full at step 54. If it is determined that the code cache is not full, the program analysis with data caching system 50 then translates the code and puts the translated code in the code cache 27, at step 56. This translation of the code and placing of the translated code into the code cache is herein defined in further detail with regard to FIG. 5. However, if it is determined at step 54 that the code cache is full, the program analysis with data caching system 50 then carries out the process of evicting a block from the code cache at step 55. The evict block in code cache process is herein defined in further detail with regard to FIG. 8.

However, if it is determined at step 54 that the code cache is not full, the program analysis with data caching system 50 then translates the code and puts the translated code into the code cache 27, at step 56, as herein defined above. After translating the original source code 22 and placing the translated code into the code cache 27, the program analysis with data caching system 50 then proceeds to step 57.

At step 57 the program analysis with data caching system 50 checks whether backpatching the "B" pointer is necessary at step 57. Backpatching is the process of modifying the destination of the branch address to a different location so that a future lookup of the translation for the destination is avoided. Determination of backpatching is herein defined in further detail with regard to FIG. 6.

Next at step 61, the program analysis with data caching process 50 then executes the code at the new program counter 26 in the code cache 27 until the translated code is done, or until reaching a branch that is not backpatched. Furthermore, at step 61, the code block frequency counter for each block counter in the block counter cache is incremented each time a block is executed.

Next, at step 62, the program analysis with data caching system 50 then determines whether the translated code in the code cache 27 has finished execution. If it is determined that the translated code in the code cache 27 has not finished execution, the program analysis with data caching process system 50 then receives the set 63 to pop from the stack the branch target address for the program counter. This branch target address is then loaded into the new program counter. The program analysis with data caching system 50 then proceeds to repeat steps 52 through 62. However, if it is determined at step 62 that the translated code and code cache 27 is done, the program analysis with data caching process 50 saves all the block frequency counters to the block counter cache and then terminates at step 69.

Figure 5:
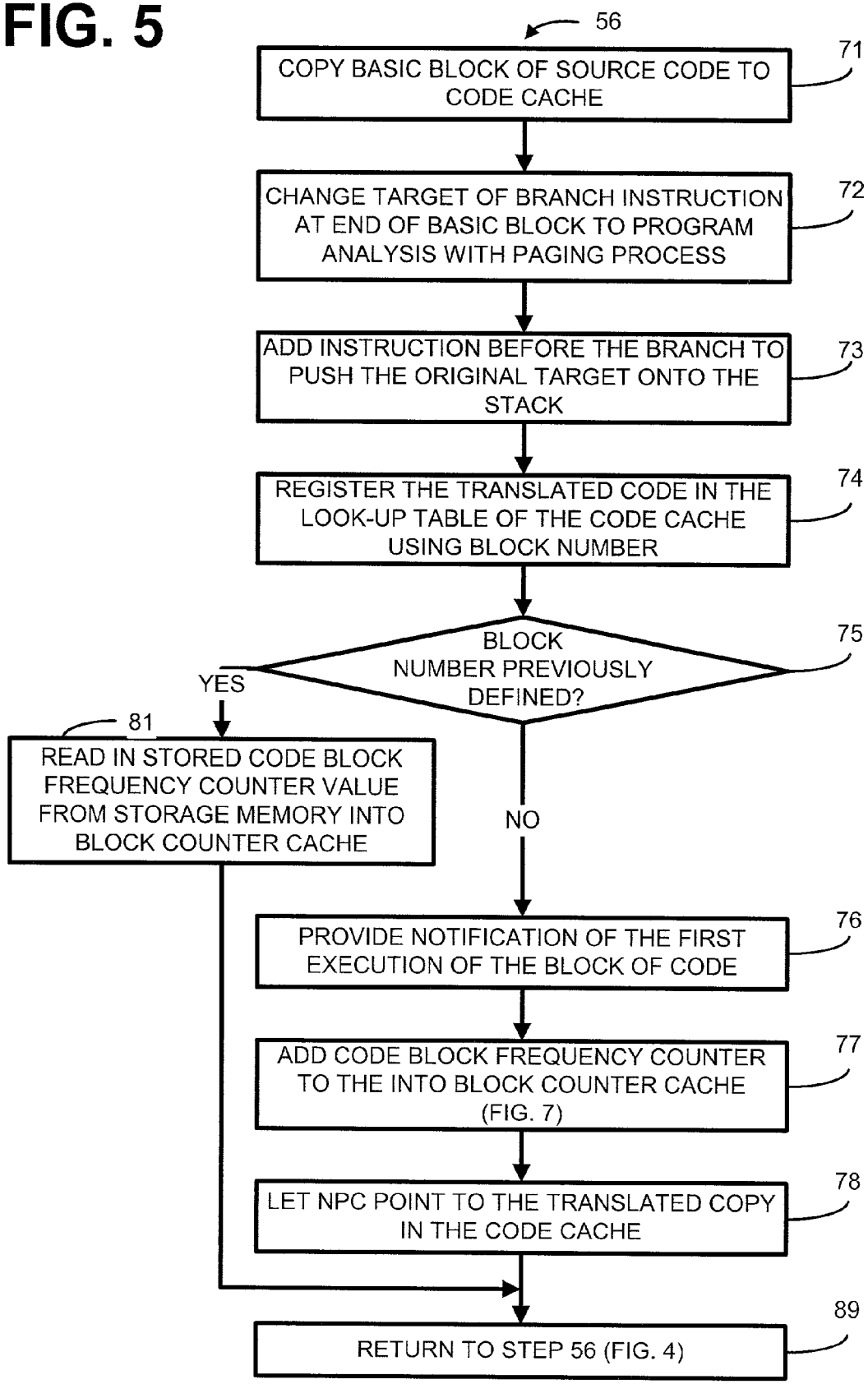
FIG. 5 is a flow chart of an example of the process that translates the original source code (step 56 of FIG. 4) and the placing of the translated code into the code cache, as shown in FIG. 4.

Illustrated in FIG. 5 is a flow chart of an example of the process that translates the original source code 22 (step 56 of FIG. 4) and the placing of the translated code into the code cache 27, as shown in FIG. 4. First, program analysis with data caching system 50 copies a basic block of the original source code 22 into the code cache 27 at step 71. The program analysis with data caching system 50 changes the branch target address of the branch instruction at the end of the basic block of source code to an address within the program analysis with data caching system 50 at step 72. The program analysis with data caching system 50 adds an instruction before the branch to push the original target address on to the stack at step 73.

Next, the program analysis with data caching system 50 registers the translated code in the code cache's lookup table using the block number at step 74. The program analysis with data caching system 50 determines whether the block number for the translated code registered in the code cache 27 has been previously defined. If the block number for the translated code in the code cache 27 has been previously defined, the program analysis with data caching system 50 then proceeds to step 81 and reads in the stored code block frequency counter value from the data storage memory 23 into the code block counter cache 25, at step 81. The program analysis with data caching system 50 then proceeds to step 89 and returns to step 56 in FIG. 4.

However, if it is determined at step 75 that the block number of the translated code and the code cache 27 has not been previously defined, the program analysis with data caching system 50 then provides notification of the first execution of that block of code at step 76. Next, at step 77, the program analysis with data caching system 50 then adds the code block frequency counter into the block counter cache 25. The process to add the block counter frequency counter to the block counter cache 25 is herein defined in further detail with regard to FIG. 7.

Then the program analysis with data caching system 50 lets the new program counter point to the translated code in the code cache 27, at step 78. The program analysis with data caching system 50 then returns to continue processing at step 56 in FIG. 4. The notification can be done in the form of writing to a file of the address range or the source line range of the block. This file, which can be called the profile data file, can be used in post processing to figure out the number time a block of source code is executed.

Figure 6:
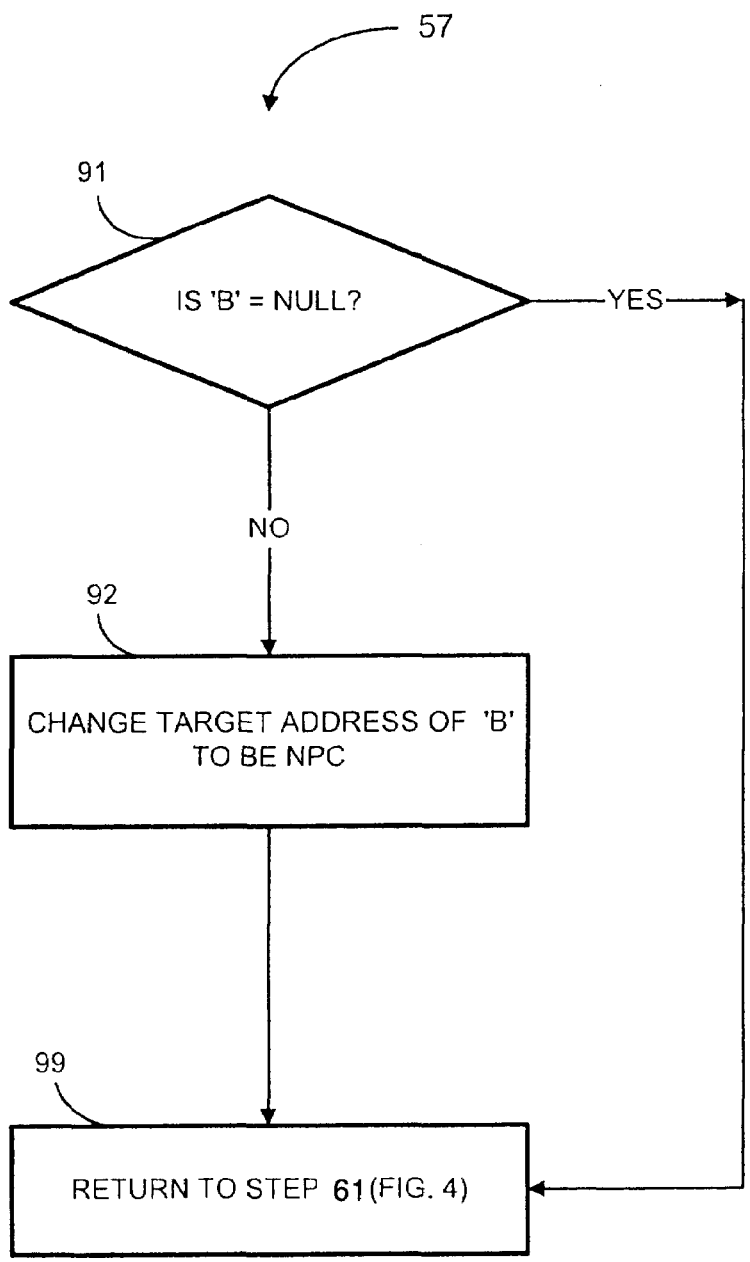
FIG. 6 is a flow chart of an example of the process that determines if a target address within the code cache has been established and some branches can be backpatched, as shown in FIG. 4.

Illustrated in FIG. 6 is a flow chart of an example of the process that determines if a target address within the code cache has been established and some branches can be backpatched (i.e., the "B" pointer if necessary), as shown in FIG 4. The program analysis with data caching system 50 first tests if the backpatch pointer "B" is equal to null at step 71. If the backpatch pointer "B" is equal to null, the program analysis with data caching system 50 continues the execution of the translated source code by returning to step 61 (FIG. 4) from step 99. If the backpatch pointer "B" is not equal to null, then the program analysis with data caching system 50 backpatches the target address of branch "B" to be the address pointed to by the new program counter 26. The backpatch testing process then returns to step 61 in FIG. 4.

Figure 7:
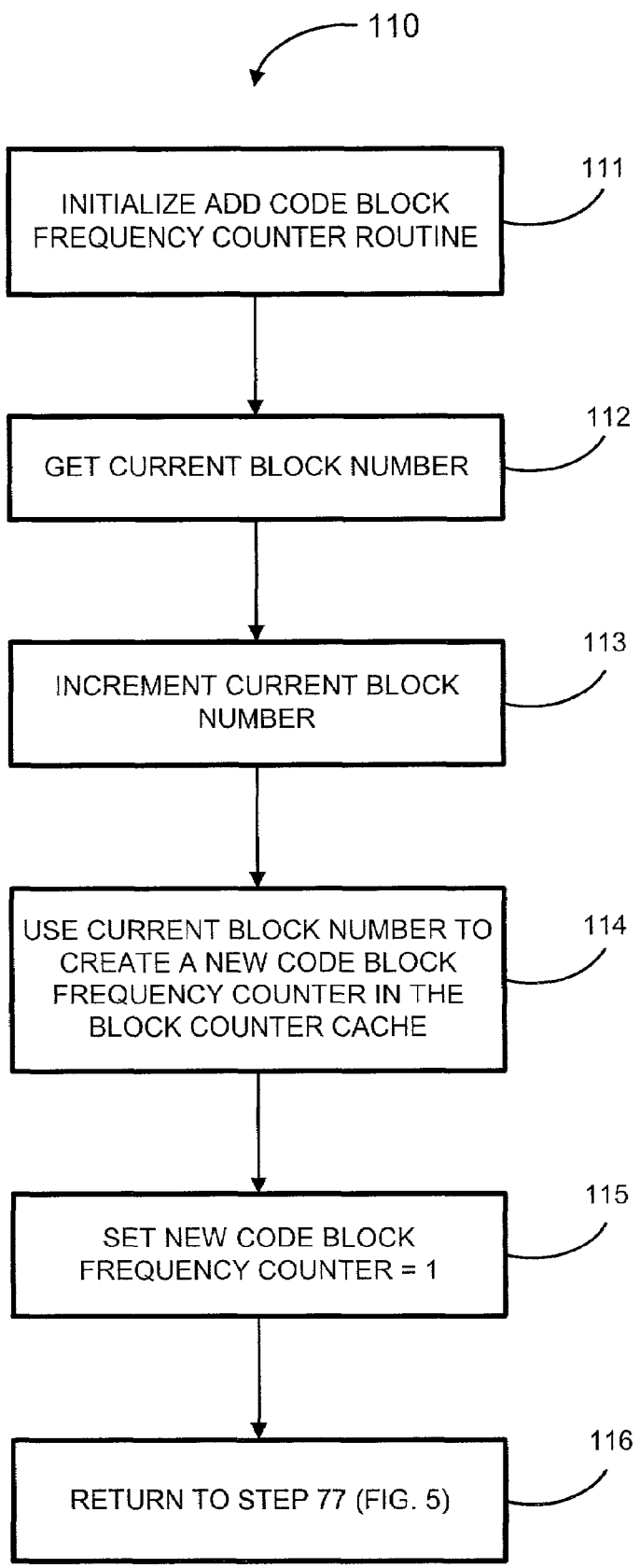
FIG. 7 is a flow chart of an example of the add code block frequency counter routine that adds the block frequency counter into the block counter cache, as referenced at step 77 in FIG. 5.

Illustrated in FIG. 7 is a flow chart of an example of the add code block frequency counter routine 110 that adds the block frequency counter into the block counter cache 25, as referenced at step 77 in FIG. 5. First, the program analysis with data caching system 50 initializes the add code block frequency counter routine 110 at step 111. Next, the add code block frequency counter routine 110 gets the current block number at step 112 and increments the current block number at step 113. At step 114, the add code block frequency counter routine 110 then uses a current block number to create a new code block frequency counter for the current code block in the block counter cache 25 at step 114. At step 115, the new code block frequency counter is set equal to one (1). The add code block frequency counter routine 110 then returns to continue processing at step 77 in FIG. 5.

Figure 8:
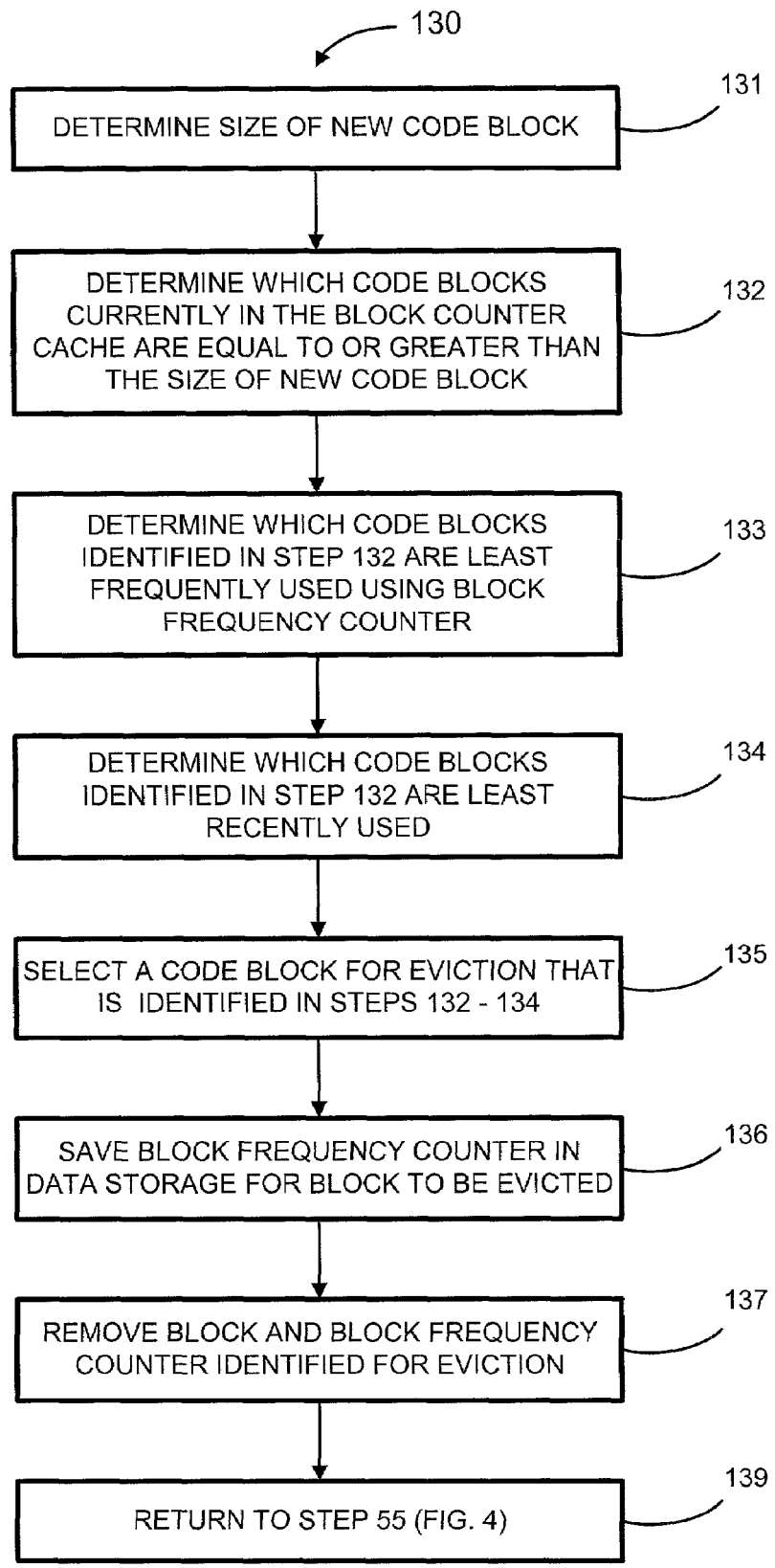
FIG. 8 is a flow chart of an example of the evict code block process that evicts a code block in the code cache, as shown in FIG. 4.

Illustrated in FIG. 8 is a flow chart of an example of the evict code block process 130 that evicts a code block in the code cache 27 (FIG. 3), as shown in FIG. 4. First, the evict code block process 130 determines the size of the new code block at step 131. At step 132, the evict code block process 130 then determines which code blocks currently in the code cache 27 (FIG. 3) are equal to or are greater than the size of the new code block. Next, there is a determination of which code blocks identified at step 132 are the least frequently used code blocks by using the block frequency counter for each code block in the block counter cache 25. At step 132, the evict code block process 130 then determines which of the code blocks identified in step 133 are least recently used. At step 135, the code block that is least recently used as determined in blocks 132-134 is then selected. At step 136, the evict code block process 130 then saves the block frequency counter of the code block to be evicted (i.e. stale code block) in data storage 23 (FIG. 3). At step 137, the evict code block process 130 then removes the stale code block from the code cache 27, and the code block frequency counter from the block counter cache 25, identified for eviction at step 135 above. The evict code in the code cache process 130 then returns to continue processing at step 55 (FIG. 4) at step 139.

In an alternative embodiment, the counter caching methodology described in FIGS. 7 and 8 can be used in an off-line or static program analysis tool. This is accomplished by encapsulating the block counter cache update logic and placing it into a runtime library. The program analysis tool then inserts calls to the runtime library during the off-line preprocessing phase.

Figure 9:
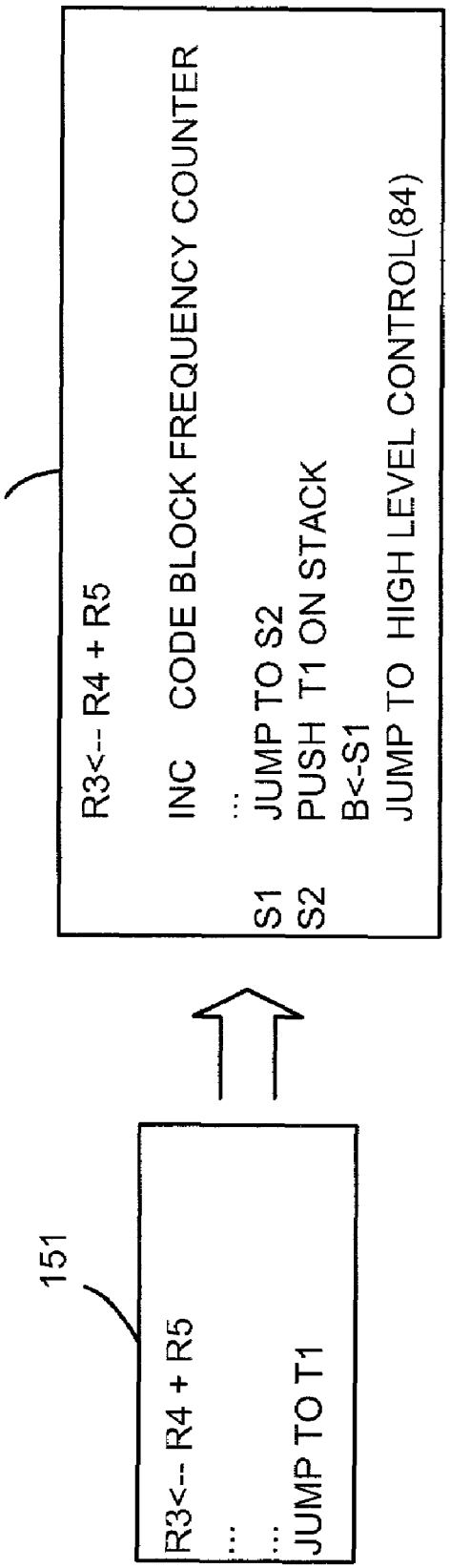
FIG. 9 is a block diagram illustrating the original program source code and the translated code put into the code cache for counting the number of times a block of code is executed, as shown in FIGS. 3 through 8.

Illustrated in FIG. 9 is a block diagram illustrating an example program 151 of the original source code 22 that is translated and includes the code block frequency counter incrementing instructions/code in the translated code 152.

The embodiment or embodiments discussed were chosen and described to provide the best illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A method to analyze a computer program that includes a plurality of executable blocks of code, the method comprising:

receiving a block of code to a code cache;
using a code block frequency counter for tracking each time said block of code is executed on said code cache, wherein additional code for incrementing said code block frequency counter is dynamically added to said block of code as said computer program is executed;
maintaining a counter cache for storing each said code block frequency counter of said block of code while said block of code is stored on said code cache, wherein said counter cache is distinct from said code cache, such that when said block of code is executed said code block frequency counter is readily available for tracking said execution;

maintaining a storage area for storing each said code block frequency counter of said block of code previously executed on said code cache, said storage area distinct from said counter cache and said code cache, said code block frequency counter being stored in said storage area after said block of code is evicted from said code cache, said block of code being evicted to make room for another block of code in said code cache, said code block frequency counter being stored for future access in a location which is distinct from said code cache and said counter cache; and in the event that said block of code is again received into said code cache for execution subsequent to being evicted, copying said code block frequency counter from said storage area to said counter cache to enable continuation of said tracking each time said block of code is executed on said code cache.

2. The method of claim 1, further comprising the step of:
identifying when said code cache is full.

3. The method of claim 2, further comprising:
determining which said code block frequency counter of said block of code stored on said counter cache is least recently executed;
evicting said least recently executed block of code, related to said code block frequency counter, from said code cache; and
copying said code block frequency counter of said least recently executed block of code from said counter cache to said storage area when said least recently executed block of code related to said code block frequency counter is evicted from said code cache.

4. The method of claim 1, wherein said receiving a block of code to a code cache further comprises:
checking said storage area to determine if said block of code is being executed for other than the first time;
loading said code block frequency counter associated with said block of code being executed for other than the first time, from said storage area into said counter cache; and
updating said code block frequency counter associated with said block of code being executed for other than the first time.

5. A computer implemented system having a computer for analyzing a computer program that includes a plurality of blocks of code, comprising:
means for executing said computer program;
means for maintaining a code cache for storing at least one of a plurality of blocks of code derived from said computer program;
means for counting each time one of said plurality of blocks of code is executed, wherein additional code for incrementing said code counting means is dynamically added to said one of said plurality of blocks of code as said computer program is executed;
means for maintaining a counter cache for storing said counting means of said plurality of blocks of code that are most recently executed, wherein said counter cache is distinct from said code cache, such that when said one of said plurality of blocks of code is executed said counting means is readily available for tracking said execution; and
means for maintaining a storage area for storing said counting means of said plurality of blocks of code that are not most recently executed, said storage area distinct from said counter cache and said code cache, said code counting means being stored in said storage area after said block of code related to said counting means is evicted from said code cache, said block of code being evicted to make room for another block of code in said code cache, said counting means being stored for future access in a location which is distinct from said code cache and said counter cache, such that, subsequent to being evicted, if said block of code related to said counting means is again received into said code cache, said code counting means may be copied from said storage area to said counter cache to enable continuation of said tracking each time said block of code related to said counting means is executed within said code cache.

6. The system of claim 5, further comprising:
means for identifying when said code cache is full.

7. The system of claim 6, further comprising:
means for copying said counting means of said plurality of blocks of code from said code cache to said storage area when said code cache is full.

8. The system of claim 7, wherein said identifying means further comprises:
means for determining which said counting means of said plurality of blocks of code in said code cache is least recently executed;
means for evicting said least recently executed block of code, related to said counter, from said code cache; and
means for copying said counting means, related to said least recently executed block of code, from said code cache to said storage area when said code cache is full.

9. The system of claim 7, further comprising:
means for checking a code cache to determine if a block of code is being executed for other than the first time; and
means for loading said counting means associated with said block of code being executed for other than the first time, into said counter cache.

10. A computer storage medium having computer-readable program code embodied therein for causing a computer system to perform a method for analyzing a computer program that includes a plurality of executable blocks of code comprising:
receiving a block of code to a code cache;
utilizing a code block frequency counter for tracking each time said block of code is executed on said code cache, wherein additional code for incrementing said code block frequency counter is dynamically added to said block of code as said computer program is executed;
maintaining a counter cache for storing each said code block frequency counter of said block of code while said block of code is stored on said code cache, wherein said counter cache is distinct from said code cache, such that when said block of code is executed said code block frequency counter is readily available for tracking said execution;
maintaining a storage area for storing each said code block frequency counter of said block of code previously executed on said code cache, said storage area distinct from said code cache and said counter cache, said code block frequency counter being stored in said storage area after said block of code is evicted from said code cache, said block of code being evicted to make room for another block of code in said code cache, said code block frequency counter being stored for future access in a location which is distinct from said code cache and said counter cache; and in the event that said block of code is again received into said code cache for execution subsequent to being evicted, copying said code block frequency counter from said storage area to said counter cache to enable continuation of said tracking each time said block of code is executed on said code cache.

11. The computer storage medium of claim 10, further comprising:
identifying when said code cache is full.

12. The computer storage medium of claim 11, further comprises:
determining which said code block frequency counter of said block of code in said counter cache is least recently executed;
evicting said least recently executed block of code, related to said code block frequency counter, from said code cache; and
copying said code block frequency counter of said least recently executed block of code from said counter cache to said storage area when said least recently executed block of code related to said code block frequency counter is evicted from said code cache.

13. The computer storage medium of claim 11, wherein said receiving a block of code to a code cache further comprises:
checking said storage area to determine if said block of code is being executed for other than the first time;
loading said code block frequency counter associated with said block of code being executed for other than the first time, from said storage area into said counter cache; and
updating said code block frequency counter associated with said block of code being executed for other than the first time.

14. A system for analyzing a computer program that includes a plurality of executable blocks of code, the system comprising:
a computer system having a computer configured for executing a block of code, said computer system comprising a cache memory;
a code block frequency counter that tracks each time a specific block of code is executed by a code cache, wherein additional code for incrementing said code block frequency counter is dynamically added to said block of code as said computer program is executed;
a counter cache for storing said code block frequency counter of a specific block of code while said specific block of code is stored on said code cache, such that when said block of code is executed said code block frequency counter is readily available for tracking said execution, wherein said counter cache is distinct from said code cache; and
a storage area for storing said code block frequency counter of a specific block of code previously executed on said code cache, said storage area distinct from said counter cache and said code cache, said code block frequency counter being stored in said storage area after said specific block of code is evicted from said code cache to make room for another block of code in said code cache, said code block frequency counter being stored for future access in a location which is distinct from said code cache and said counter cache such that, in the event that said block of code is again received into said code cache for execution, subsequent to being evicted, said code block frequency counter may be copied from said storage area to said counter cache to enable continuation of said tracking each time said block of code is executed on said code cache.

15. The system of claim 14, further comprising:
logic that identifies when said code cache is full.

16. The system of claim 15, wherein said logic determines which said code block frequency counter of said specific block of code stored on said counter cache is least recently executed, evicting said least recently executed block of code related to said code block frequency counter from said code cache, and copies said code block frequency counter of said specific block of code from said counter cache to said storage area when said least recently executed specific block of code is evicted from said code cache.

17. The system of claim 15, wherein said logic checks said storage area to determine if said specific block of code is being executed for other than the first time, and loads said code block frequency counter associated with said specific block of code being executed for other than the first time, from said storage area into said counter cache, and updating said code block frequency counter associated with said specific block of code being executed for other than the first time.

* * * * *

UNITED STATES PATENT AND TRADEMARK OFFICE
CERTIFICATE OF CORRECTION

| | | |
|---|---|---|
| PATENT NO. | : 7,243,339 B2 | Page 1 of 1 |
| APPLICATION NO. | : 09/898351 | |
| DATED | : July 10, 2007 | |
| INVENTOR(S) | : Pratap Subrahmanyam et al. | |

It is certified that error appears in the above-identified patent and that said Letters Patent is hereby corrected as shown below:

In column 4, line 21, after "memory" delete "2," and insert -- 12, --, therefor.

Signed and Sealed this
First Day of January, 2013

David J. Kappos
*Director of the United States Patent and Trademark Office*